United States Patent Office 3,502,740
Patented Mar. 24, 1970

3,502,740
PRODUCTION OF ISOPRENE
John G. Zajacek, Strafford, Pa., and Ming Nan Sheng, Cherry Hill, N.J., assignors to Atlantic Richfield Company, Philadelphia, Pa., a corporation of Pennsylvania
No Drawing. Filed June 25, 1968, Ser. No. 739,664
Int. Cl. C07c 73/00, 11/18; B01j 1/10
U.S. Cl. 260—681          9 Claims

ABSTRACT OF THE DISCLOSURE

Isoprene is produced by oxidizing 2-methylbutene-2 to the isomeric unsaturated hydroperoxides, reducing the unsaturated hydroperoxides to the corresponding unsaturated alcohols and dehydrating the alcohols to isoprene.

BACKGROUND OF THE INVENTION

Field of the invention

This invention relates to a method for the production of isoprene by the photo-oxidation of 2-methylbutene-2 to produce the isomeric unsaturated hydroperoxides which are used to epoxidize an olefin thereby reducing the hydroperoxides to the corresponding unsaturated alcohols, which, in turn, are dehydrated to isoprene.

PRIOR ART

A number of methods for the production of isoprene have been proposed, many of which include cracking certain petroleum hydrocarbon fractions. These methods have not been particularly suitable for commercial production since large amounts of by-product impurities are produced which are difficult or impossible to separate from the isoprene.

Isoprene can be polymerized to cis-polyisoprene which is sufficiently similar to natural rubber to be a highly useful polymer. Two problems have prevented the full commercialization of this polymer. The first problem has been finding a method for producing isoprene at a cost which would render the polymer competitive in price with natural rubber and the second is providing a method for producing isoprene of sufficiently high purity which will give a polymer having physical properties competitive with natural rubber. It has been found that if isoprene contains as little as 0.1 percent of other polymerizable materials, the physical properties of cis-polyisoprene produced therefrom will be sufficiently deleteriously affected to render the polymer completely inferior to natural rubber.

Thus, for example, although 2-methylbutene-2 can be catalytically dehydrogenated to isoprene the 2-methylbutene-2 which is available commercially is admixed with other $C_5$ olefins which cannot be separated by conventional commercial methods with the result upon dehydrogenation other compounds are produced together with the isoprene which are not separable from the isoprene by commercial methods and thereby render the isoprene unsuitable for the preparation of polymers competitive with natural rubber.

It has been shown in U.S. Patent No. 2,950,237 (1960) to Sharp that 2-methylbutene-2 may be photooxidized to a mixture of two isomeric unsaturated hydroperoxides by irradiating with light in the visible range utilizing a tetraaryl porphyrin as the photosensitizer and air or pure molecular oxygen.

It is also known to utilize alkyl hydroperoxides and molybdenum-containing catalysts to epoxidize olefinic compounds, however, the surprising discovery has been made in accordance with this invention that unsaturated hydroperoxides in the presence of molybdenum catalysts can be utilized to epoxidize monoolefins without the unsaturation in the hydroperoxide undergoing epoxidation. Instead, they are reduced to the corresponding unsaturated alcohols which can be dehydrated by conventional methods to isoprene.

SUMMARY OF THE INVENTION

In accordance with this invention 2-methylbutene-2 is photooxidized by the use of a free-oxygen containing gas such as air or molecular oxygen, light irradiation, and a photosensitizer catalyst to produce unsaturated hydroperoxides.

The isomeric unsaturated hydroperoxides thus produced are distilled to remove the unreacted olefin. The hydroperoxides are then utilized to epoxidize an olefin such as propylene in the presence of a molybdenum-containing catalyst. The propylene oxide or other epoxide is separated and utilized as an article of commerce. The hydroperoxides are reduced in the epoxidation process to the corresponding unsaturated alcohols, which, in turn, are dehydrated to isoprene.

It is an object of this invention therefore to provide a method for the production of isoprene.

It is another object of this invention to provide a method for the production of isoprene wherein an additional commercially useful chemical is produced.

It is another object of this invention to provide a method for epoxidizing an olefin with an unsaturated hydroperoxide and produce the corresponding unsaturated alcohol and olefin oxide.

Other objects of this invention will be apparent from the following description of the preferred embodiments and from the claims.

DESCRIPTION OF THE PREFERRED EMBODIMENTS

The present invention is directed to a three step process for the production of isoprene the first step being the oxidation of 2-methylbutene-2 utilizing air or molecular oxygen or any free oxygen containing gas, light irradiation, and a photosensitizer as the catalyst.

The oxidation is carried out preferably in glass apparatus transparent to light. Light in the wave length range of 3000 to 8000 angstroms is completely suitable. The speed of the oxidation reaction is proportional to the intensity of the light irradiation. The light may be furnished by any convenient means. For example, 150-watt spotlights have been employed with a glass reaction vessel equipped with a mechanical stirrer, a reflux condenser and means for introducing oxygen or air into the reaction mixture in order to carry out a batch reaction. In another design, circular fluorescent light sources around the reaction vessel are suitable, and in another design the reaction mixture filled the annular space between two concentric tubes with the light source consisting of a straight fluorescent tube positioned inside the inner tube of the reactor. This is a preferred design because of its efficiency. In another design, the reactor consists of a long straight glass tube, surrounded by straight fluorescent tubes to furnish the light irradiation.

In general it is preferred to use fluorescent tubes since they furnish only a small amount of heat and it is preferred that the reaction be carried out at temperatures below about 40° C., since at this temperature the 2-methylbutene-2 is still in the liquid phase and it is desired to carry out the reaction in the liquid phase. In general, it is preferred to carry out the reaction until about from 40 to 50 percent of the olefin is oxidized.

In a batch reactor this merely involves reaction time and amount of light irradiation. In a continuous reactor such as a long tube the flow rate and length of tube as well as the amount of light irradiation can be controlled to provide this desired degree of conversion.

The reaction can be carried out at room temperature or below, i.e. 0° C., however, the most convenient range is room temperatures up to 40° C. If super-atmospheric pressures are employed, higher temperatures can be utilized but these are unnecessary.

The amount of oxygen or air introduced into the reaction is not extremely critical, however, it is preferred that it be sufficient to keep the reaction mixture saturated.

The photosensitizer or photooxidation catalyst is preferably one which is soluble in the reaction mixture or at least partially soluble. Suitable catalysts are the meso-tetraarylporphyrins such as those set forth in U.S. Patent No. 2,950,237, afore-mentioned. The alpha,beta,gamma,delta-tetraphenyl porphyrin is a convenient catalyst and a convenient method for its preparation is shown in the article by Adler et al., J. of Organic Chem., vol. 32, page 476, 1967. Other photosensitizers also have been described in the literature, for example, octaethylporphyrin, in the article by Whitlock et al., J. of Org. Chemistry, vol. 33, pages 2169 to 2171, May 1968. Other photosensitizers also can be utilized as catalysts for the oxidation step of this invention, for example, tetrabromofluorescein, tetraiodotetrachlorofluorescein, chlorophyl, hemin, hematoporphyrin and the like.

The two isomeric unsaturated hydroperoxides which are produced by the oxidation step have the formulas:

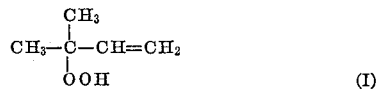

(I)

and

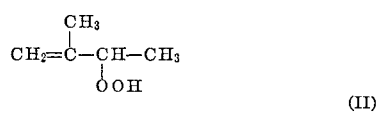

(II)

Upon reduction I becomes 3-methyl-3-hydroxy-1-butene and II becomes 2-methyl-3-hydroxy-1-butene.

The second step of the process is particularly important and novel. It has been found that the isomeric unsaturated hydroperoxides, I and II, can be reacted with a monoolefin having from 3 to 20 carbon atoms such as propylene, butylene, hexene-2, octene-1 and the like, in the presence of a molybdenum-containing catalyst to epoxidize the olefin to the epoxyalkane and reduce the hydroperoxides to the corresponding unsaturated alcohols. Since this step produces epoxides useful as monomers the step does not add to the cost of the isoprene but may actually be a credit. The molybdenum catalysts and method for this type of epoxidation is set forth in detail in U.S. Patent No. 3,351,635, although such patent does not disclose using unsaturated hydroperoxides as the oxidizing agent. Propylene is particularly preferred as the olefin since the propylene oxide which is produced is extremely useful as a monomer for various polymers as is well known in the art. The preferred reaction conditions are a temperature of about 75° C. to 100° C. with sufficient pressure to maintain a liquid phase reaction.

Suitable catalysts are the molybdenum hexacarbonyl or molybdenum oxyacetylacetonate, although any molybdenum-containing catalyst may be used as disclosed in the above-mentioned patent including metallic molybdenum. The amount of catalyst, i.e. the amount of molybdenum, is in the catalytic range, for example, in the range of from 0.001 weight percent to 1 weight percent of the reaction mixture, although higher or lower amounts can be used. Amounts ranging from 500 p.p.m. to 700 p.p.m. molybdenum based on the amount of reaction mixture have been found to be completely suitable. Although 1 mole of hydroperoxide is required to epoxidize 1 mole of olefin, it is preferred to have a molar excess of the olefin in order to completely reduce the hydroperoxide to the unsaturated alcohol. Thus, a mole ratio of hydroperoxide to olefin of 1:5 has been found to be completely satisfactory.

The unreacted olefin and olefin epoxide are separated from the unsaturated alcohols by distillation and the unsaturated alcohols are thereafter dehydrated to the isoprene.

The dehydration reaction is preferably carried out over anhydrous magnesium sulfate. The catalyst is prepared by moistening anhydrous magnesium sulfate powder with water, pelleting the moistened powder (approximately 3/16″ diameter by 1/8″ thick) and drying the pellets at 1000° F. for 16 hours. The pellets are held at 150° C. for at least 8 hours prior to use. Dehydration temperatures in the range of 240° C. to 260° C. are suitable with a narrower range of 245° C. to 255° C. being slightly more preferred.

While dehydration over magnesium sulfate is a preferred method, any dehydration catalyst known in the art can be utilized, for example, alumina, silica alumina and the like.

The following examples are provided for the purpose of illustrating the invention in greater detail but these examples should not be construed as limiting.

EXAMPLE I

To 4 liters of 2-methylbutene-2 were added 0.28 gram of alpha,beta,gamma,delta-tetraphenylporphin. The tetraphenylporphin was dissolved in 100 ml. of chloroform before it was added to the olefin. The olefin-photosensitizer mixture was added to a 5000 ml. three-necked flask provided with means for introducing oxygen, a high speed stirrer and a Dry Ice condenser. The oxygen was passed into the olefin until it was saturated and then the olefin was circulated through a glass reactor wherein the mixture filled the annular space between two concentric tubes with the light source consisting of a 15-watt fluorescent lamp (daylight fluorescent), which was positioned inside the inner tube of the reactor. The reactor had a capacity of 2500 ml. and the olefin-catalyst mixture was pumped through the reactor from the flask at the rate of 1000 ml. per minute so that residence time in the reactor was approximately 2½ minutes.

The olefin-catalyst mixture after leaving the reactor was recirculated to the flask where it was again saturated with oxygen and recirculated to the reactor. The product contained 0.00021 mole of mixed hydroperoxides per hour. When a 215-watt lamp was employed the rate was 0.03 mole per hour. It was found also that the Beer's law applied and thus if the annular space were of larger diameter a lower concentration of catalyst could be employed in accordance with these principles. The annular space was 3.5 cm. between the outer wall of the inner tube and the inner wall of the outer tube. The hydroperoxides produced were found to be an approximately equal molar mixture of the unsaturated hydroperoxides I and II set forth hereinbefore. The yield of hydroperoxides was 66.5 percent based on the amount of light irradiation into the reaction mixture.

EXAMPLE II

The mixture of unsaturated hydroperoxides I and II as obtained by the method of Example I was partially distilled to remove a portion of the olefin, then xylene was added and the product was vacuum distilled to remove all of the olefin. The product obtained varied from about 70 percent to 95+ percent unsaturated hydroperoxides with the remainder being the unsaturated alcohols which were formed by decomposition of the hydroperoxide.

Four runs were carried out in an autoclave utilizing in each run 10 grams of the two-isomeric unsaturated hydroperoxides produced as in Example I having a purity of 71.6 percent and 0.05 gram of molybdenum hexacarbonyl as the catalyst. The first run was carried out in 100 ml. benzene solution with 200 ml. of propylene for one hour at 100° C. There was obtained 1.19 grams of propylene oxide (vapor phase chromatographic analysis) constituting a 29 percent yield of propylene oxide based on hydroperoxide converted and a 100 percent conversion of the hydroperoxides.

The second run was identical to the first except that it was carried out at 90° C. for 3 hours. An identical yield of propylene oxide was obtained and also a 100 percent conversion of hydroperoxides.

In the third run only 50 ml. of benzene was utilized as the solvent and 250 ml. of propylene was employed. The reaction was carried out at 85° C. for 5 hours, and 1.7 grams of propylene oxide were obtained constituting a 39.6 percent yield based on hydroperoxide converted with an 88 percent conversion of the hydroperoxides.

In the fourth run the hydroperoxide mixture was 86 percent purity and 50 ml. of benzene and 250 ml. of propylene were employed. The reaction was carried out at 80° C. for 5 hours and 1.36 grams of propylene oxide was obtained constituting a 35 percent yield of the propylene oxide based on the hydroperoxide converted with an 80 percent conversion of the hydroperoxides.

EXAMPLE III

Two runs were carried out utilizing sealed glass tube reactors and 6 grams of octene-1 as the olefin. In the first run 1.02 grams of the mixture of isomeric unsaturated hydroperoxides I and II (86 percent purity) as obtained in acordance with Example I and 0.001 gram of molybdenum oxyacetylacetonate catalyst were employed. In this run the temperature was 90° C. for one hour and there was obtained 0.432 gram of 1,2-epoxyoctane constituting a 54 percent yield based on hydroperoxide converted with a 76 percent conversion of the hydroperoxides.

In the second run 1.03 grams of the mixture of hydroperoxides was employed, 86 percent pure, with 0.005 gram of the molybdenum oxyacetylacetonate catalyst. The reaction temperature was 85° C. for one hour and 0.315 gram of the 1,2-epoxyoctane were obtained constituting a 54 percent yield based on the hydroperoxide converted with a 61 percent conversion of the hydroperoxides.

These runs demonstrated that higher olefins can be epoxidized by the method of this invention utilizing the mixture of unsaturated hydroperoxides as the oxidizing agent.

EXAMPLE IV

Four runs were carried out with hexene-2 as the olefin and in sealed tubes as the reactor. In each run 1.02 grams of the mixed unsaturated hydroperoxides I and II produced as in Example I but of 95+ percent purity was employed together with 4 grams of the hexene-2. In the first run 0.006 gram of molybdenum hexacarbonyl catalyst was utilized with a reaction temperature of 70° C. for two hours. There was obtained a 71 percent yield of the 2,3-epoxyhexane based on the hydroperoxide converted and the conversion of hydroperoxides was 77 percent.

In the second run 0.005 gram of the molybdenum hexacarbonyl catalyst were employed with a reaction temperature of 75° C. for one hour. The yield of epoxide was 57 percent with a hydroperoxide conversion of 75 percent.

In the third run 0.01 gram of molybdenum hexacarbonyl catalyst were employed with a reaction temperature of 75° C. for one hour. There was obtained a 76 percent yield of the epoxide with a conversion of 70 percent of the hydroperoxides.

The fourth run was identical to the third run except that a reaction temperature of 80° C. was utilized. A 64 percent yield of epoxide was obtained with a 76 percent conversion of hydroperoxides.

These runs also demonstrate that internal olefins may be epoxidized in accordance with this invention utilizing the mixture of unsaturated hydroperoxides as oxidizing agents.

EXAMPLE V

In order to show that the unsaturated alcohols obtained by the method of this invention can be dehydrated to isoprene a mixture of such alcohols, i.e. 2-methyl-3-hydroxy-1-butene and 3-methyl-3-hydroxy-1-butene in vapor phase was passed through a 3″ x 5″ column packed with anhydrous magnesium sulfate pellets produced as has been described. The pellets were held at a temperature of about 245° C. to 247° C. by means of a heating coil surrounding the column. The charge rate (liquid) was about 10 ml. per hour. The product analyzed 73.2 percent isoprene with 7.6 percent of unreacted unsaturated alcohol, a carbonyl by-product of 5.0 percent and other by-products not identified of 14.2 percent. The total product recovered based on charge was approximately 90 percent, all percentages being by weight. This run demonstrated that isoprene can be produced by the method of this invention starting with 2-methylbutene-2.

As many possible embodiments can be made of this invention without departing from the broad scope thereof, it is to be understood that all matter herein set forth is to be interpreted as illustrative and not as unduly limiting the invention.

We claim:

1. A method for the production of isoprene which comprises irradiating 2-methylbutene-2 with light in the presence of a free oxygen containing gas and a photosensitizing catalyst to produce two isomeric unsaturated hydroperoxides having the formulas:

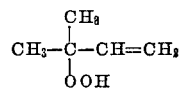

and

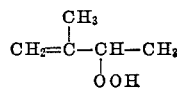

reacting said hydroperoxides with a monoolefin having from 3 to 20 carbon atoms in the molecule in the presence of a molybdenum-containing catalyst to reduce the hydroperoxides to the corresponding unsaturated alcohols and convert said monoolefin to the corresponding epoxyalkane, separating said unsaturated alcohols from said epoxyalkanes and dehydrating said alcohols to isoprene.

2. The method according to claim 1 wherein the light is in the visible range and photosensitizing catalyst is a meso-tetraarylporphyrin.

3. The method according to claim 1 wherein the light has a wave length in the range of 3000 to 8000 Angstroms and the photosensitizing catalyst is an alpha,beta,gamma,delta-tetraphenylporphin.

4. The method according to claim 1 wherein the monoolefin is propylene.

5. The method according to claim 1 wherein the monoolefin is octene-1.

6. The method according to claim 1 wherein the monoolefin is hexene-2.

7. The method according to claim 1 wherein the molybdenum containing catalyst is molybdenum hexacarbonyl or molybdenum oxyacetylacetonate.

8. The method according to claim 1 wherein the dehydration of the unsaturated alcohols is carried out over a magnesium sulfate dehydration catalyst at a temperature of from 240° C. to 260° C.

9. The method according to claim 1 wherein the light has a wave length in the range of from 3000 to 8000 Angstroms, the photosensitizing catalyst is alpha,beta,gamma,delta-tetraphenylporphin, the monoolefin is propylene, and the unsaturated alcohols are dehydrated over a magnesium sulfate catalyst at a temperature of from 240° C. to 260° C. to produce the isoprene.

References Cited

UNITED STATES PATENTS

| | | | |
|---|---|---|---|
| 2,558,844 | 7/1951 | Gray et al. | 204—158 |
| 2,950,237 | 8/1960 | Sharp | 204—158 |
| 2,951,797 | 9/1960 | Sharp | 204—162 |
| 2,955,996 | 10/1960 | Mashio et al. | 204—158 |
| 2,967,897 | 1/1961 | Sharp | 260—681 |
| 3,109,800 | 11/1963 | Sharp | 204—162 |
| 3,255,258 | 6/1966 | Charles et al. | 260—632 |
| 3,351,635 | 11/1967 | Kollar | 260—348.5 |
| 3,391,213 | 7/1968 | Fetterly | 260—681 |
| 3,391,214 | 7/1968 | Fetterly | 260—681 |

DELBERT E. GANTZ, Primary Examiner

G. E. SCHMITKONS, Assistant Examiner

U.S. Cl. X.R.

204—158, 162; 260—348.5, 610, 632, 642